United States Patent [19]

Blatt

[11] 3,892,298
[45] July 1, 1975

[54] VARIABLE ORIFICE SHOCK ABSORBER

[76] Inventor: Leland F. Blatt, 31915 Groesbeck Hwy., Grosse Pointe Shores, Mich. 48026

[22] Filed: Feb. 13, 1974

[21] Appl. No.: 441,962

[52] U.S. Cl.............. 188/289; 188/299; 267/64 B
[51] Int. Cl............................................. F16f 9/48
[58] Field of Search .......... 188/289, 299, 314, 317, 188/322; 267/64 R, 64 B

[56] References Cited
UNITED STATES PATENTS

| | | | |
|---|---|---|---|
| 2,812,717 | 11/1957 | Brown................................. | 188/314 |
| 2,994,442 | 8/1961 | Frederick........................... | 267/64 R |
| 3,149,831 | 9/1964 | Mercier............................... | 267/64 R |
| 3,152,667 | 10/1964 | Powell ................................ | 188/289 |
| 3,190,634 | 6/1965 | Rumsey et al...................... | 188/289 |
| 3,451,510 | 6/1969 | Hartwig .............................. | 188/314 |
| 3,797,615 | 3/1974 | Stembridge......................... | 188/317 |

*Primary Examiner*—Trygve M. Blix
*Assistant Examiner*—Edward R. Kazenske
*Attorney, Agent, or Firm*—Cullen, Settle, Sloman & Cantor

[57] ABSTRACT

A shock absorber has a body with bore and counterbore. The bore is filled with a fluid on the blind end of the piston while the counterbore is partially filled with fluid under pre-load of a floating piston. An apertured piston and rod assembly with a float valve closed is retracted in the bore when the piston rod extending from the counterbore and body is engaged by a moving body to be decelerated and stopped. A variable orifice head in the bore directs liquid to a return chamber which communicates with a hollow metering pin directing the liquid through the piston and through radial passages into the counterbore. A spring-biased floating piston moves in the counterbore as it fills with liquid for maintaining a pre-load pressure upon the liquid within the body. The metering pin is tapered so that as the piston retracts relative thereto, the flow of energy-absorbing fluid to the counterbore is gradually decreased and the piston gradually and smoothly stops. On return of the load, the piston is biased outwardly. The float valve on the piston opens and unmetered fluid returns to said bore by pressure of the floating piston and spring load.

8 Claims, 3 Drawing Figures

VARIABLE ORIFICE SHOCK ABSORBER

BACKGROUND OF THE INVENTION

The purpose of the shock absorber is to dissipate the kinetic energy producted by moving masses, to bring them to a smooth stop at the end of the stroke, or in a certain period of time. These applications are encountered in automatic machinery which have carriages moving back and forth with equipment attached thereon of considerable mass coupled to a machanism having no mechanical disadvantage at the end of the travel to stop the masses smoothly.

Shock absorbers of this type are also employed to cushion box cars, automobile bumpers, and are used as shock dampeners on all types of vehicles.

Most of the shock absorbers employed are built for a particular shock load specified in absorbtion inch pounds of force. The present shock absorber of a certain size can be used by adjusting across a broad range from maximum to minimum flow adjustment. This is accomplished by increasing or decreasing the liquid flow across variable orifices.

BRIEF DESCRIPTION OF THE INVENTION

It is an object of the present invention to provide an improved shock absorber whereby upon engagement of a load to the piston and piston rod assembly, which may be spring-biased by a spring in the counterbore chamber, or by air pressure in a port coupled with the spring, or by a spring surrounding the piston rod, exerting force on the head of the piston rod, there will be a metered transfer of liquid from one chamber to a secondary chamber of the shock absorber with the extent of flow being regulated by one of two variable metering orifices.

It is another object to provide an improved shock absorber having a pair of chambers with a spring-biased float valve in one of said chambers adapted to retract against spring pressure when said chamber is partially filled for maintaining a pre-load pressure on the liquids within said chambers.

It is another object to provide an improved metering pin so constructed as to progressively and gradually decrease the flow of metered fluid from a chamber as the piston retracts in said chamber gradually decelerating the load engaging the shock absorber and bringing same to an eventual smooth stop.

It is another object to provide an improved metering valve assembly in conjunction with the metered transferred return of fluid from one chamber to another, wherein the return flow may be regulated between maximum and minimum flow.

These and other objects will be seen from the following specification and claims in conjunction with the appended drawing in which:

THE DRAWING

It will be understood that the above drawing illustrates merely a preferred embodiment of the invention, and that other embodiments are contempated within the scope of the claims hereafter set forth.

DETAILED DESCRIPTION OF THE INVENTION

Figure 1:
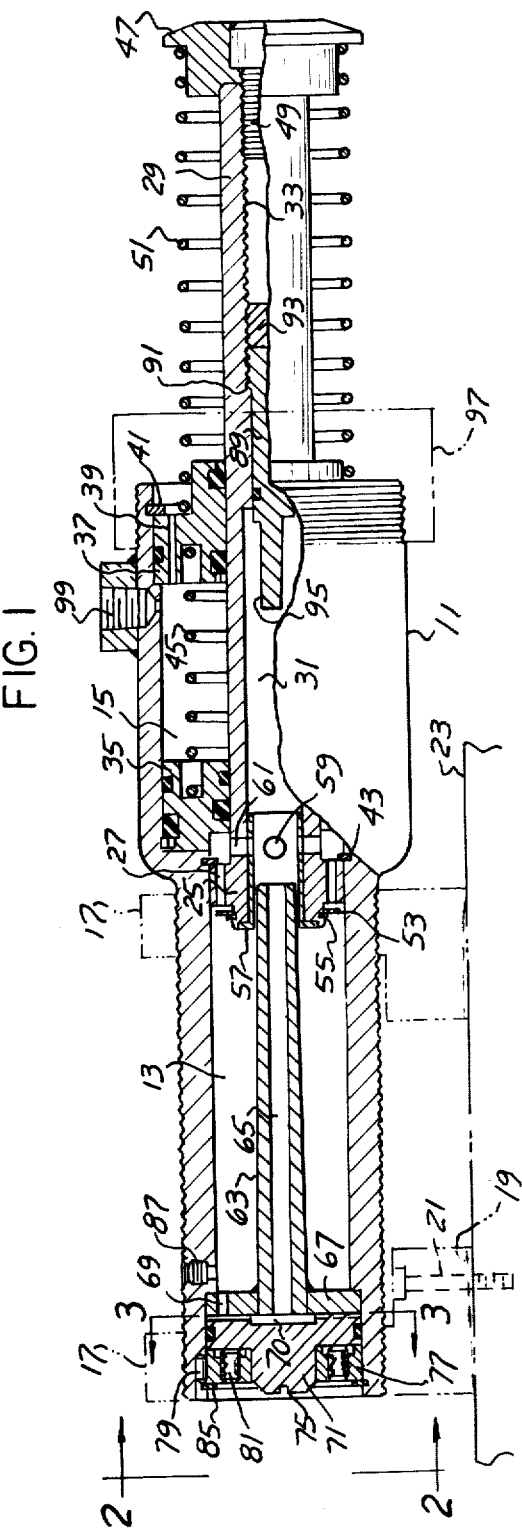
FIG. 1 is a fragmentary longitudinal section of the present shock absorber.

Referring to the drawing, the present shock absorber, FIG. 1, includes body 11 having bore 13 and counterbore 15. Bore 13 is completely filled with a suitable liquid while counterbore 15 is minutely filled with the same liquid, allowing the spring loaded floating piston to create a pre-load pressure within the chambers. Exterior portions of the body are threaded and are adapted to receive thereover the apertured and threaded end supports 17. Their bottom surfaces are formed at an angle at 19 so that when mounted upon a support base 23 and secured thereto by fasteners 21, sufficient stress will be transmitted through the end supports as to effectively anchor the body in position against dislodgement.

Piston 25 movable in bore 13 has a series of axial passages 27 therethrough, which interconnect the bore 13 and counterbore 15. Piston rod 29 is integral with and forms a part of said piston, has an internal bore 31, a counterbore 33 and projects through the counterbore 15 and may be sealed through gland 37 allowing chamber 15 to be pressurized by port 99 or, in the absence of a seal, may be apertured to atmosphere by a series of axial passages 39.

Said gland with suitable seals is nested within a shouldered end portion of the body and retained by the snap ring 41. The internal snap ring 43 is nested within an end portion of bore 13 and serves to limit outward movement of piston 25. The floating piston 35 is movable within counterbore 15 and suitably sealed therein over and with respect to piston rod 29. Coiled compression spring 45 is interposed between said floating piston and gland 37.

End cap 47 is mounted over the end of said piston rod and secured thereon by the cap screw 49. Elongated coiled compression spring 51 surrounds the piston rod and is interposed in compression between the end cap 47 and gland 37, normally biasing the piston rod to the position shown in FIG. 1.

Float valve 53 in the form of a disc, is slidably mounted upon an inner portion of said piston within bore 13 in registry with the piston passages 27 and retained against relative outward movement by snap ring 55. The headed bushing 57 is pressed through an axial bore in said piston and extends into the bore 31 of the piston rod. A series of right-angularly related bores 59 extend through said bushing in registry with corresponding radial ports 61 in said piston which communicate with one end of counterbore 15 rearwardly of the floating piston 35.

Metering pin 63 having an elongated bore 65 is nested within the body bore 13 and terminates at one end in the head or flange 67 having a series of orifices or apertures 69 adjacent one end of said body adapted for fluid communication to the return chamber 70, FIG. 1.

Figure 3:
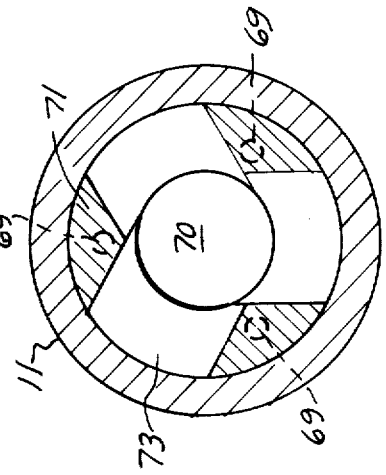
FIG. 3 is a section taken in the direction of arrows 3—3 of FIG. 1.

This chamber is further defined by the rotatable metering plate 71 which is sealed within an end portion of the body against and adjacent the head 67. Said metering plate has a series of angular passages 73, FIG. 3, which at one end, communicate with the return chamber 70, FIG. 1, and at their other ends, respectively and variably register with the bleed passages or orifices 69 to variably control, depending upon the degree of rotation of the metering plate, the quantity of fluid flow from bore 13 to the return chamber 70. Return fluid continues through the bore 65 of the metering pin into the bushing 57 and the bore of the piston 31 for communication with the radial passages 59 in said bushing and the corresponding radial ports 61 which communicate with the counterbore 15.

Figure 2:
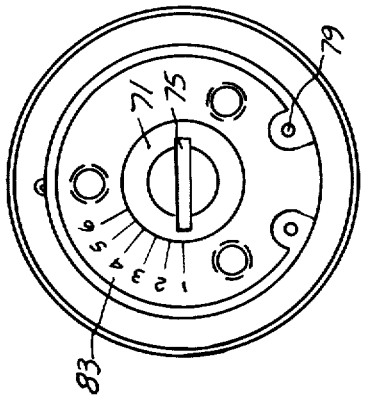
FIG. 2 is a left end view thereof.
Figure 4:
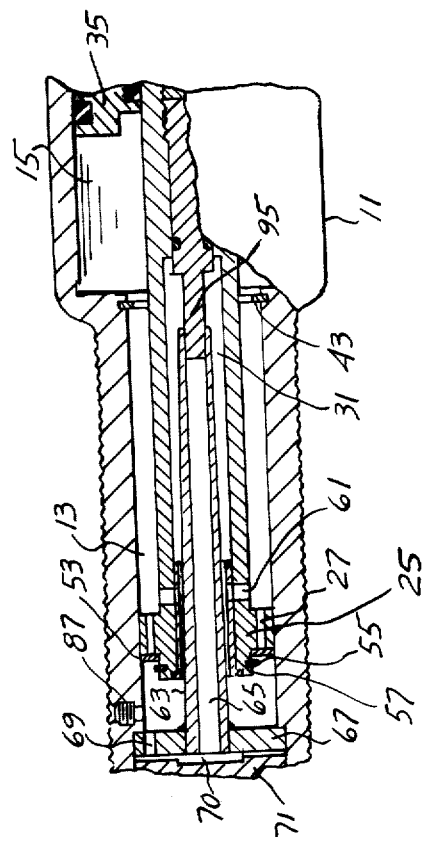
FIG. 4 is a detailed view of a metering pin and metering screw.

The metering plate on one side has an outwardly extending boss with a transverse adjusting slot 75 therein, said boss extending through a corresponding aperture in the retainer plate 77 secured within the end of said body by the pins 79 and snap ring 85. As shown in FIG. 2, a dial 83 with indicia, 1 through 6, is applied to the exterior face of the retainer plate adapted for registry with the adjusting slot 75 in the metering plate.

With the set screws 81 loosened and using a screw driver, the metering plate may be rotated so that its slot is in registry with any of the apertures, 1 through 6, for determining the amount of fluid flow through the passages 69 and corresponding angular passages 73 to the return chamber 70. There is a maximum fluid flow when the slot 75 is in registry with the numeral 6 and a minimum fluid flow when in registry with the numeral 1. Thus, to increase the fluid flow, the metering plate is rotated clockwise. Similarly, to decrease the flow, the metering plate is rotated counterclockwise. In FIG. 2, the metering plate is shown at minimum fluid flow position. This is determined by the variable registry of the metering plate passages 73 over and with respect to the passages 69 in the head 67 of metering pin 63. Once the metering plate has been rotatably adjusted to the desired position for the desired flow of fluid, the set screws 81 are adjusted to frictionally and retainingly engage said metering plate.

The body 11 adjacent one end, has a threaded radial bore receiving the closure plug 87 used to facilitate the bleeding of air and the filling of fluid. The body is initially filled with fluid directed through the open end of the piston rod 29, with metering screw 89 and cap screw 49 removed.

Fluid is poured into the piston rod 29, filling bore 13, permitting air therein to escape past loosened bleeder plug 87. Thereafter, metering screw 89 is projected down into the bore of the piston rod to the desired predetermined metering position and is held in this preset position by set screw 93.

The inner end of the metering screw has an extension 95 of reduced dimension and tapered inwardly towards its outer end. It is of such shape that as the piston rod is retracted under the force of a load moving against the cap 47 causing rearward movement of the piston 25, ultimately, the extension 95 will register gradually within the bore 65 of the metering pin. This gradually shuts off further flow of fluid from the return chamber, bringing the retracting piston rod 29 to a smooth stop, absorbing any remaining kinetic energy at the last increments of the piston rod stroke.

Stop 97 is threaded over the outer end of the body, FIG. 1, thus limiting a moving load from over actuating the piston rod assembly by mechanical engagement with cap 47.

In actual operation and before retraction of the piston, the floating piston 35 is in some position slightly in advance or to the right of the position shown in the drawing due to the over-fill effect of the liquid, thus creating a pre-load pressure within chamber 13.

An additional port 99 is shown upon the body adjacent and in communication with the counterbore 15, normally closed by a suitable plug. Under some conditions where it is desired that there be an extra pre-load or of a large capacity of liquid, the floating piston 35 may be completely removed from the assembly and chamber 15 partially filled with fluid, of course, closing off the gland passages 39. Chamber 15 would, furthermore, be pressurized with an outside air source so that the air over liquid would create a further pre-load pressure in chamber 13 if desired.

Under the present design, however, such final preload may be necessary only under most critical applications. The present pre-load spring 45 coupled with the retainer spring 51, is believed sufficient under normal conditions for creating the desired pre-load of fluids within chamber 13.

OPERATION

With the shock absorber in an acceptable mounting position, assuming a moving mass such as a carriage containing a load contacts the piston rod end cap 47, it will force the piston 25 into the liquid in chamber 13. This causes the float valve 53 to close with respect to the passages 27. Liquid, therefore, in chamber 13 is now being forced through the passages 69 in the head 67 on metering pin 63. The fluid moves through the passages 73 as variably located by adjustment of the metering plate 71 and into the return chamber 70.

The fluid then flows through the bore 65 of the metering pin entering the bushing 57, entering the chamber 31 within the piston rod and then passing through the ports 59 in the said bushing and corresponding radial passages 61 into the front end of chamber 15 or counterbore back of floating piston 35. This forces the floating piston rearward against the action of the coil compression spring 45.

The kenetic energy in slowing down the load which engages the cap 47 is now being absorbed by the liquid within chamber 13 crossing first the end of the tapered metering pin through passages 69 as well as the passages 73 in the metering plate into the return chamber 70. Somewhat later in the stroke, energy is further absorbed across the preset area of the metering plate 71 as the piston retracts from the rest position shown in FIG. 1. As the piston 25 retracts with respect to the tapered surface of the metering pin which is gradually increasing in diameter, portions of the metering pin are received within the bore of the piston with the result that there is a gradually decreasing flow of fluid through the bore 65 and into the chamber 15 back of the floating piston. There is a gradual slowing down the flow and decelerating the mass which engages the shock absorber end cap. As the piston retracts further with respect to the bore 13, the metering screw extension 95 enters the center of the metering pin 63, changing the rate of flow allowed by the pre-set metering plate. In this manner, it is possible to effectively absorb kenetic energy through a wide range by the various corrulation of adjustments there are available and, primarily, by rotative controlled adjustment of the metering plate 71, FIG. 1.

It is contemplated that under some circumstances, the present shock absorber will function without the floating piston 35 and corresponding spring 45. In this case, counterbore chamber 15 would be filled approximately two-thirds full of fluid and air pressure applied to port 99 creating an air over fluid pressure to pre-load the fluid for the return of piston assembly at the end of the cycle. This extra fluid capacity would also allow for faster heat dissipation. Such a shock absorber would, nevertheless, provide upon impact and retraction of the piston rod, and the closing of the valve 53, the forcing of metered fluid through the variable controlled orifices 69 and 73 into the return chamber and thence through the metering pin 63 back into the counterbore 15. It is the regulation of this flow through the metered passages 69, 73 which absorb kenetic energy and, additionally, the flow of fluid from the chamber 31 through the ports 59 and 61 into counterbore 15. It is noted that as the piston retracts, the exterior surface of the metering pin enlarges thus, reducing the passageway for the fluid in chamber 31 to obtain communication through the ports 59 and 61 to thus, slow down the flow of fluid between the two chambers.

Once the load which has engaged the shock absorber at 47 is reversed and moves in the other direction, the spring 51 then under compression, expands causing a movement to the right of the piston rod and connected piston. Now the float valve 53 opens to permit an unmetered flow of liquid back into the original chamber 13, returning the shock absorber to the rest position shown in FIG. 1.

Having described my invention, reference should now be had to the following claims.

I claim:

1. A shock absorber comprising a body having a bore terminating in an enlarged counterbore, the bore completely filled with liquid, and the counterbore partially filled with liquid;

said counterbore being closed by an apertured gland vented to atmosphere;

a piston having an axial passage and adjacent one end a plurality of radial ports communicating therewith and with said counterbore, and a plurality of bleed passages interconnecting said bores;

said piston being movable within said bore and including a hollow piston rod extending through said counterbore and axially outward of said body;

an end cap on said rod adapted to be engaged by a moving mass toward the end of a longitudinal stroke;

a coiled spring, interposed between said cap and said gland, normally biasing said rod outwardly of the body;

a float valve in said bore, movable upon said piston, in registry with said passages and closing the same on retraction of said piston and opening said passages on forward return movement of said piston, permitting flow of liquid from said counterbore to said bore;

a disc-like head with axial apertures anchored in said body at one end of said bore defining at one end of the body a return chamber to receive liquid on retraction of said piston;

a metering plate sealed and rotatably adjustable in said body outwardly of said head closing the body and defining said return chamber; there being a series of radial metering passages in said metering plate having inner and outer ends and at their inner ends in communication with said return chamber and with their outer ends in variable registry with said head apertures to provide for a pre-adjusted return flow of fluid into the return chamber;

an axially apertured metering pin at one end anchored to said head and communicating with said return chamber;

the other end of said pin extending into said piston; said retraction of said piston over said pin displaces liquid from said return chamber through the full length of the metering pin into said piston and piston rod and through said radial ports to said counterbore.

2. In the shock absorber of claim 1, a normally retracted floating piston slidably mounted and sealed on the piston rod and nested and sealed within said counterbore adjacent said bore; and a coil spring interposed between the floating piston and said gland.

3. In the shock absorber of claim 2, a metering screw within said piston rod adapted for longitudinal adjustment relatively thereto for projection into the piston rod and securing therein for adjustably increasing the internal pressure on the fluid in said bore and counterbore.

4. In the shock absorber of claim 1, and a retainer plate having an outer face and an axial bore anchored within said one end of the body in registry with and outwardly of said metering plate; said metering plate having an axial boss extending through said retainer plate to permit manual rotation of the metering plate regulating said return flow.

5. In the shock absorber of claim 4, and a series of adjustable set screws extending through said retainer plate adapted for loosening to permit manual rotation of the metering plate, and after adjustment thereof, adapted for frictional registry therewith for securing said metering plate in adjusted position.

6. In the shock absorber of claim 1, said metering pin being tapered longitudinally of reducing diameter towards its other end; whereby on initial retraction of the piston, metering is a minimum and is gradually increased as said piston retracts along the increasing diameter of said metering pin to provide a gradual and uniform deceleration of the mass engaging said end cap.

7. In the shock absorber of claim 1, a metering screw within said piston rod adapted for longitudinal adjustment relative thereto; for projection into the piston rod and securing therein for increasing the initial pressure of the fluid in said bore and counterbore.

8. In the shock absorber of claim 7, one end of the metering screw projecting into the hollow portion of said piston rod and of such diameter as to progressively enter said metering pin on retraction of said piston, for gradually cutting off liquid flow therethrough.

* * * * *